July 4, 1939.  W. C. BARNES ET AL  2,164,302
METHOD AND APPARATUS FOR DETECTING FLAWS IN METALLIC BODIES
Filed Dec. 26, 1934   5 Sheets-Sheet 1
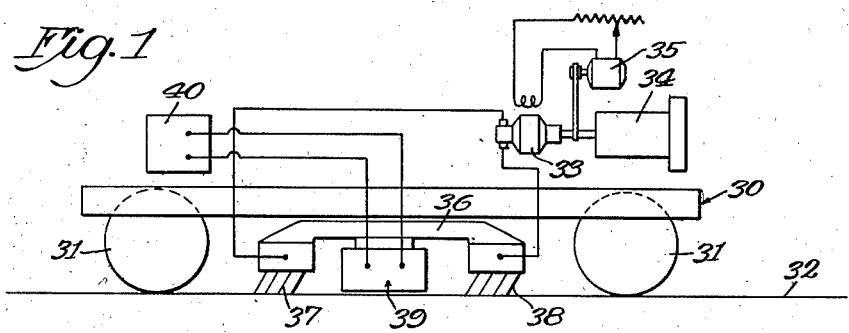
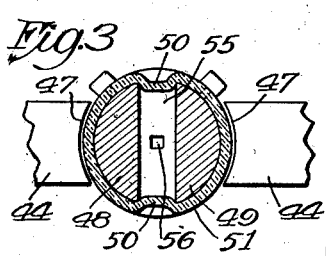
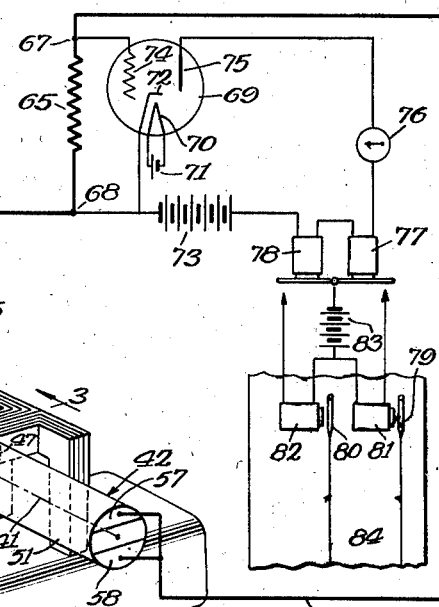
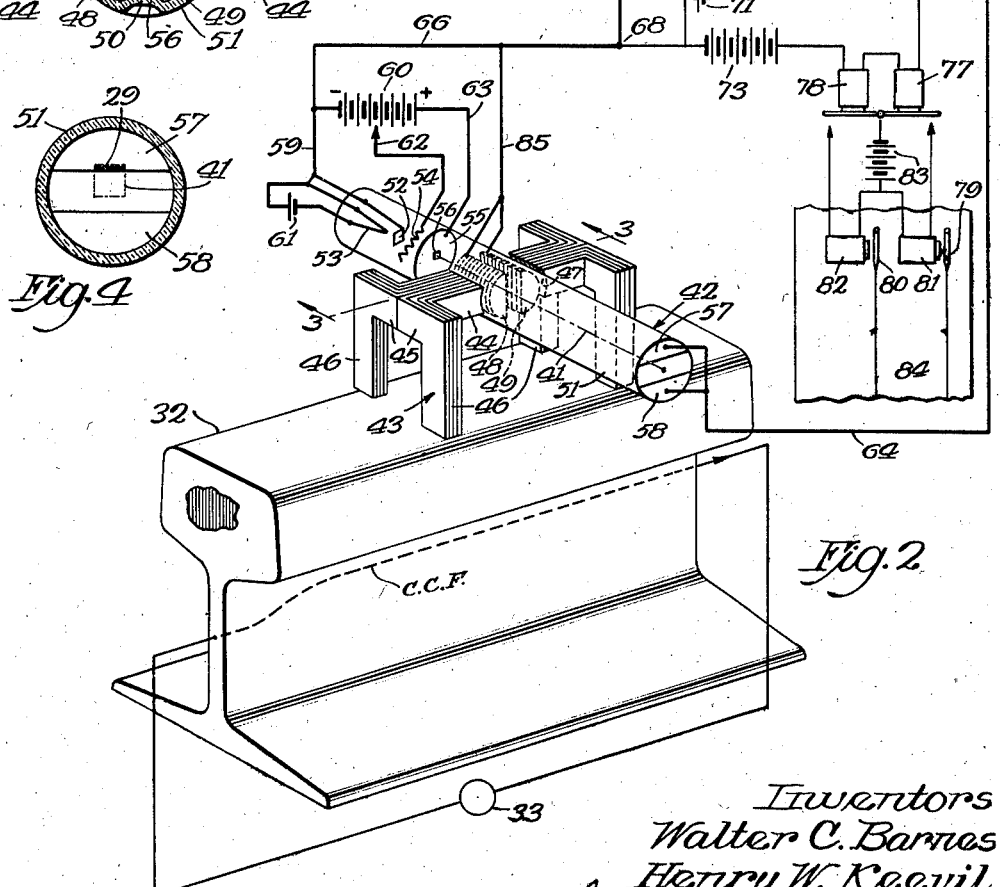
Inventors
Walter C. Barnes
Henry W. Keevil
By Gibson, Mann &co
Attys.

July 4, 1939.　　　W. C. BARNES ET AL　　　2,164,302
METHOD AND APPARATUS FOR DETECTING FLAWS IN METALLIC BODIES
Filed Dec. 26, 1934　　　5 Sheets-Sheet 2
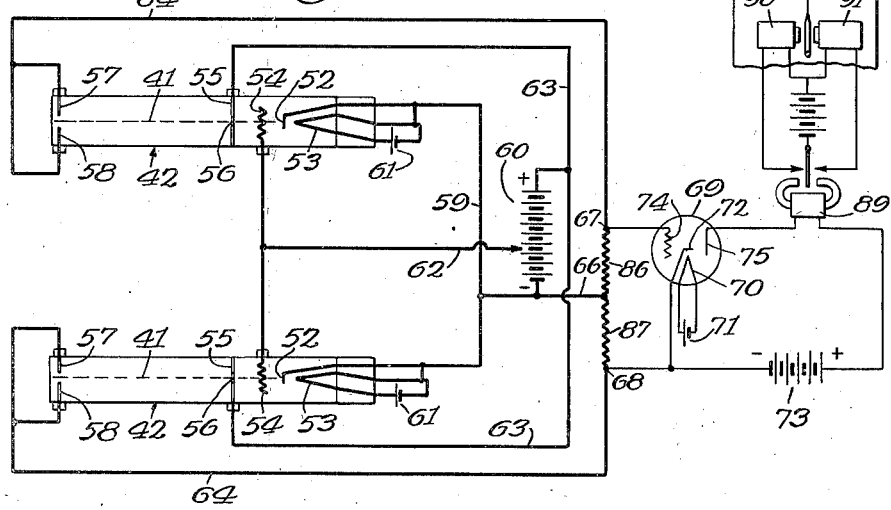
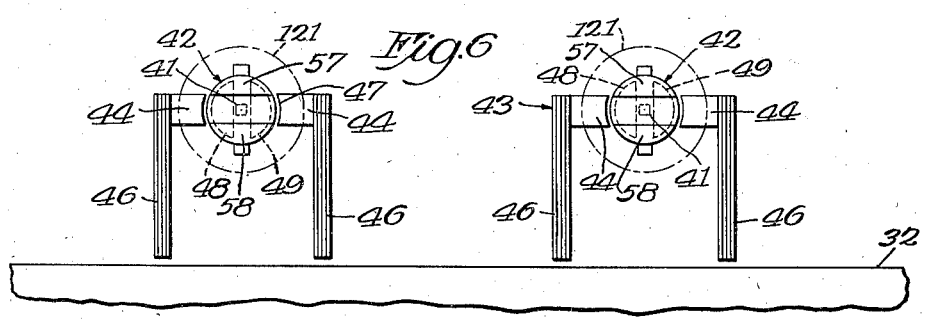
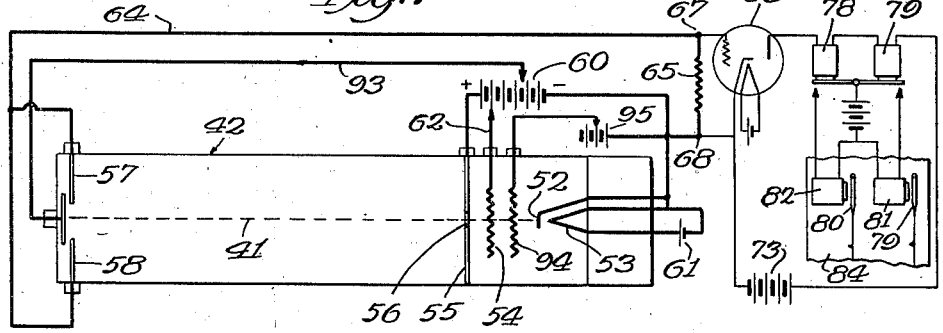
Inventors
Walter C. Barnes
Henry W. Keevil

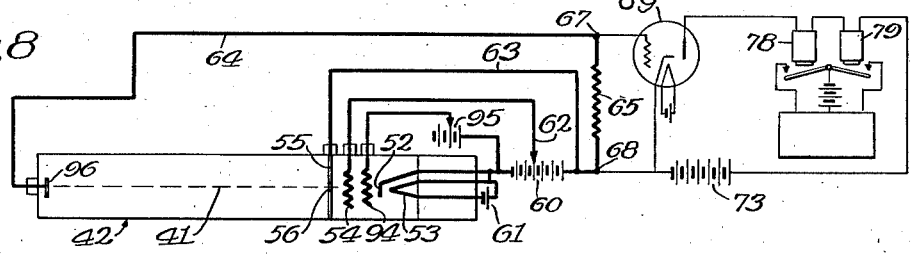
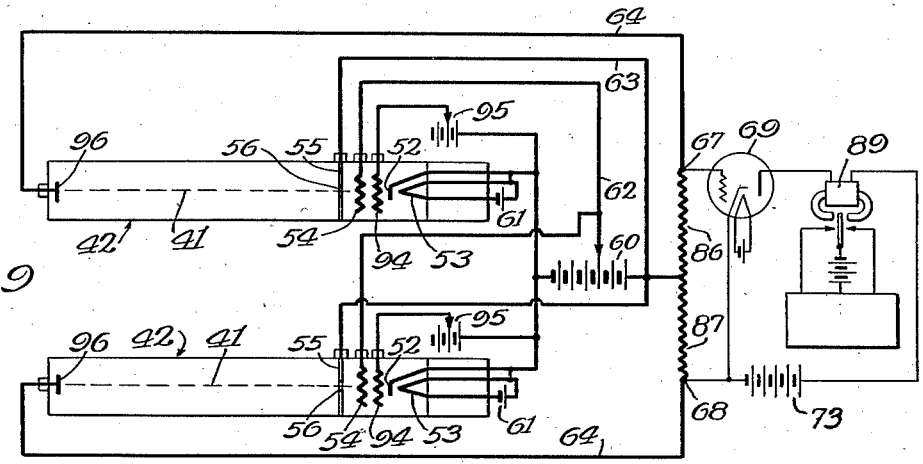
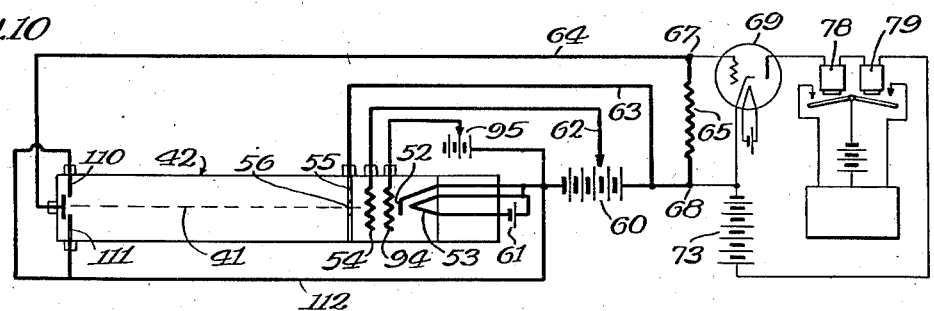
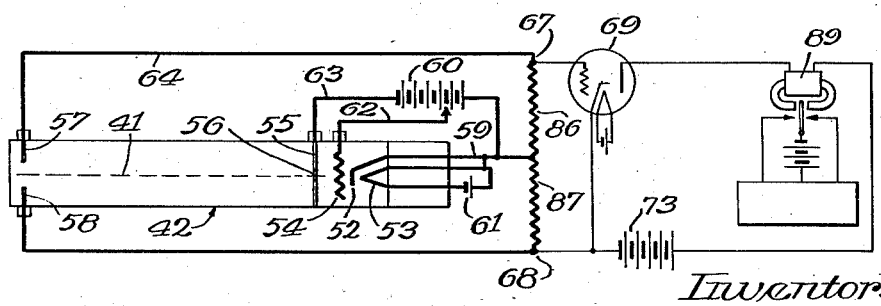

Inventors
Walter C. Barnes
Henry W. Keevil
By Gilson, Snow & Co.
Attys.

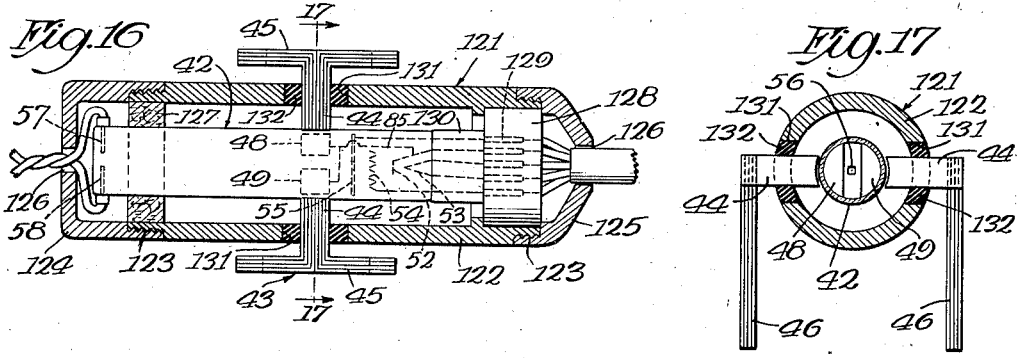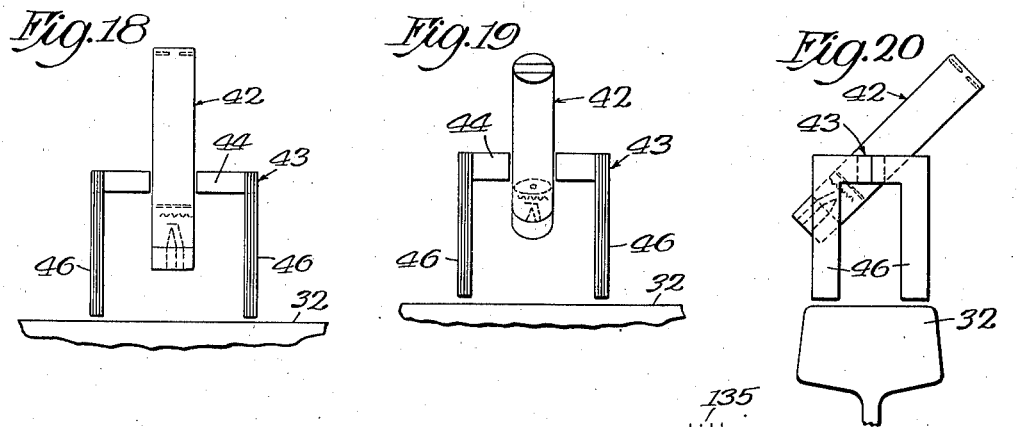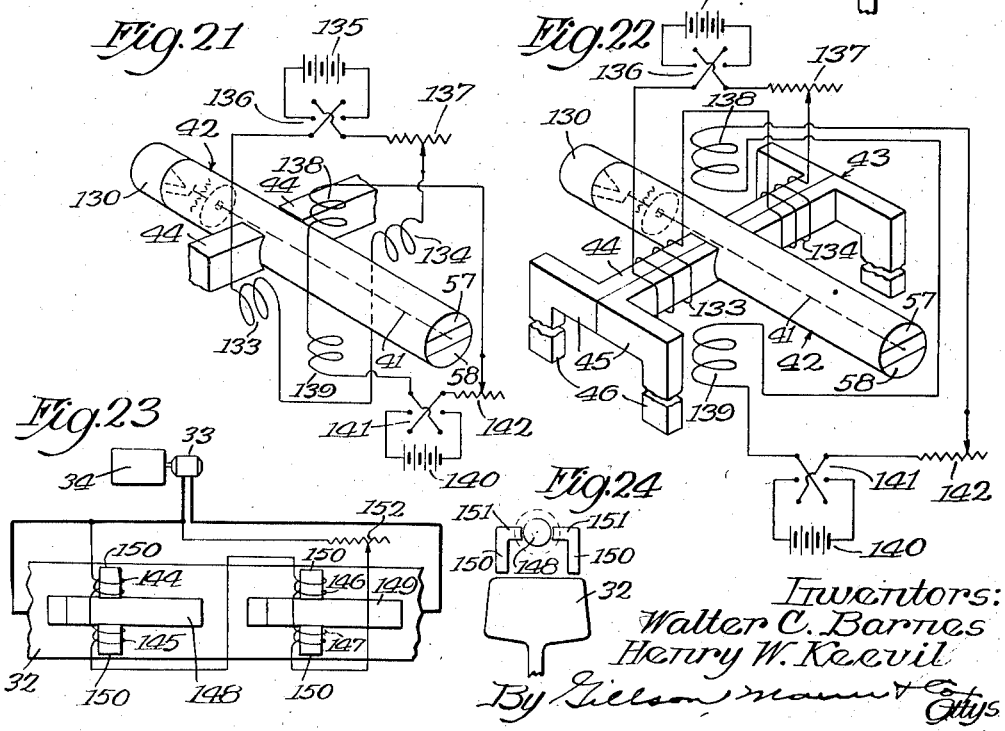

Patented July 4, 1939

2,164,302

UNITED STATES PATENT OFFICE 2,164,302

METHOD AND APPARATUS FOR DETECTING FLAWS IN METALLIC BODIES

Walter C. Barnes, Lake Bluff, and Henry W. Keevil, Highland Park, Ill.

Application December 26, 1934, Serial No. 759,148

7 Claims. (Cl. 175—183)

A well known method of detecting flaws in metallic bodies (particularly in rails) is to pass a strong electric current through the body under test and then explore the magnetic field surrounding the body with an induction coil that is connected to suitable amplifying and recording apparatus. Whenever a variation in magnetic flux is encountered by the coil (as when the center of current flow is displaced due to a flaw) a current impulse is induced in the coil which, after being amplified, can be used to operate a relay or other apparatus for recording the fact that the coil has traversed a distortion in the magnetic field.

An inherent disadvantage of this method of flaw detection is that the flaw indication is received as a current impulse which is only momentary in duration. In order to minimize this disadvantage, two or more induction coils are often used spaced apart in such a manner that the impulse induced in one coil will add with those induced in the others (at given car speeds) and thereby give a stronger indication of the variation in the magnetic field.

The present invention avoids the above difficulty by eliminating induction pickup entirely and employing in its place detecting apparatus that is capable of maintaining an indication whenever the unit is in an abnormal magnetic field. Furthermore, the extent of the variation in the magnetic field may be determined within limits by observing the strength of the indication.

In addition to the above advantages, the present invention aims to improve flaw detection methods and apparatuses by employing an electron beam for exploring the magnetic field surrounding the conductor; by providing means for initially adjusting the direction of the beam and for overcoming any residual magnetism that may be present; by incorporating the beam in an electrical circuit in such a manner that it acts as a magnetically responsive electron switch; by shielding the beam from undesirable components of the magnetic field; by placing the beam in such relation to the magnetic field that uniform variations in the magnetic field caused for example by uncontrollable changes in the energizing current through the conductor and by minute differences in the height of the beam above the conductor, do not actuate the switch; by employing two or more electron switches connected electrically to recording apparatus so that successive operation of the switches will actuate the recording apparatus although simultaneous action of the switches will not; by employing recording apparatus that is capable of distinguishing between the indications produced by the several electron switches employed; and by otherwise adapting the underlying principles of this invention to the conditions of service.

Further and other objects and advantages will become apparent as the disclosure proceeds and the description is read in conjunction with the accompanying drawings, all of which are more or less diagrammatic in form, and in which Fig. 1 represents a car equipped with a current generator for delivering current to the rails of a track, and a detecting unit made in accordance with this invention;

Fig. 2 is a diagrammatic view which will be used in explaining the underlying principles of this invention;

Fig. 3 is a sectional view taken on the line 3—3 of Fig. 2;

Fig. 4 is a view illustrating the manner in which the extent of the beam deflection determines the amount of current flowing through the circuit which operates the recording apparatus;

Fig. 5 shows a modified form of the invention in which two cathode ray tubes are employed;

Fig. 6 shows a preferred way of mounting the two cathode ray tubes;

Fig. 7 shows a slightly more complex form of electron switch suitable for use in indicating flaws;

Fig. 8 shows an electron switch which is normally energized and which actuates front contact relays in the recording apparatus;

Fig. 9 shows a pair of normally energized electron switches connected in balanced electrical circuit adapted to operate a polarized relay in the recording apparatus;

Fig. 10 shows a normally energized electron switch equipped with side targets for protecting the ends of the tube when the beam is deflected;

Fig. 11 is a normally de-energized electron switch connected in an electrically balanced circuit adapted to operate a polarized relay in the recording apparatus so that the direction of beam deflection can be determined by observation of the recording apparatus;

Fig. 16 is a longitudinal, sectional view showing one manner in which the electron switch may be shielded from undesirable components of the magnetic field surrounding the rail;

Fig. 17 is a transverse, sectional view taken on the line 17—17 of Fig. 16;

Fig. 18 illustrates a modified form of the invention in which the cathode ray tube is placed in a vertical position;

Figs. 19 and 20 show the cathode ray tube mounted in an inclined position;

Fig. 21 illustrates the means for initially adjusting the direction of the electron beam;

Fig. 22 is similar to Fig. 21 but shows the horizontal windings mounted on the core so that any residual magnetism of the core may be wiped out by inducing a counter magnetic flux;

Figs. 23 and 24 show a modified form of the invention in which the tubes are placed longitudinally of the rail or other conductor;

Figure 12:
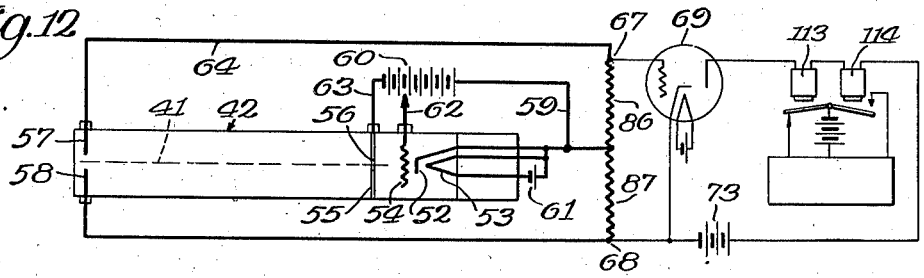
Fig. 12 is identical with Fig. 11 with the exception that front and back contact relays are substituted for the polarized relay in the recording apparatus.

The magnetic flux surrounding the rail or other conductor to be examined for flaws is preferably created by passing a low voltage, high amperage, direct current through the body under test, although in some cases, it may be desirable to set up the flux by providing a strong electro-magnet, the two poles of which embrace the portion of the body which is under observation for flaws. The strength of the energizing current or flux, however, must be adjusted to the characteristics of the detecting apparatus.

In Fig. 1, a car is diagrammatically indicated at 30, equipped with wheels 31 adapted to run on a track 32. Mounted on the car is a current generator, or dynamo 33, driven by an internal combustion engine 34, or by any other suitable means, and preferably the dynamo is equipped with a field control 35 to compensate for variations in the speed of the engine 34.

A carriage 36 is mounted beneath the car between the wheels 31 and has brushes 37 and 38 for introducing current into the rail. Detecting apparatus, generally indicated at 39, is mounted adjacent to the rail between the brushes 37 and 38 and is electrically connected to recording apparatus 40 mounted on the car frame.

In the present invention, the detecting apparatus consists of an electron beam indicated by a dotted line 41 in Fig. 2 and the character of the magnetic field surrounding the rail is indicated by deflections of the beam produced by selected components of the magnetic field.

The deflection of the beam as well as the observation of its movement in response to the magnetic field may, of course, be accomplished in a great many ways. The beam may be arranged in horizontal position either transversely to or parallel with the direction of current flow through the rail. It may occupy a horizontal position, a vertical position, or an intermediate position. The movement of the beam may be observed by allowing it to fall upon a fluorescent screen, or it may be incorporated into an electron switch which is electrically connected to suitable recording apparatus mounted within the car body.

Inasmuch as a patent specification is addressed to those skilled in the art, no attempt will be made to describe in detail the many possible forms in which the invention may be embodied, but instead a preferred form of the invention will be described, together with a few modifications, and from this disclosure, other embodiments will readily suggest themselves. The appended claims, therefore, are not to be limited to the specific disclosure of this specification, but are to be construed as broadly as the prior art will permit.

Referring now to Fig. 2, the electron beam 41 is shown embodied in a cathode ray tube, generally indicated at 42, mounted in a horizontal position at right angles to the direction of current flow through the rail. The tube is spaced an appropriate distance from the rail head and has a core 43 associated with it which consists, in the present instance, of a two-part laminated yoke, each part of which consists of a longitudinal, horizontal portion 44, a transverse horizontal portion 45, and vertical legs 46. The ends of the longitudinal portions 44 of the yoke are rounded, as indicated at 47 to conform with the cylindrical shape of the tube 42, and internal pole pieces 48 and 49 reduce the effective air gap between the parts of the yoke to the desired amount. The internal poles 48 and 49 are preferably laminated and may be held within the tube by slightly indenting the glass or other material forming the tube, as indicated at 50 in Fig. 3. It will be understood that the electron beam 41 passes between the poles 48 and 49.

The magnetic field surrounding the rail is, of course, at right angles to the direction of current flow, and as long as the magnetic field is uniform and without distortion, there is no longitudinal component of the field traversing the air gap between the internal pole pieces 48 and 49, or if there is, the flow of flux is equal and opposite. However, when one end of the core traverses a locally distorted portion of the field due to displacement of the center of current flow through the rail (indicated in Fig. 2 by dotted line marked C. C. F.), a longitudinal component of magnetic flux will pass transversely through the tube to deflect the beam in one direction, and a similar flow of flux will pass through the tube in the other direction when the other end of the core traverses the distorted field, thus causing the beam to deflect in the opposite direction.

The cathode ray tube 42 comprises an envelope 51 of glass or other suitable material, a cathode 52, and heater filament 53 mounted at one end of the tube, a grid anode 54 and a disk anode 55 provided with a small opening 56, preferably square, and spaced target plates 57 and 58 mounted in the end of the tube remote from the cathode 52.

The cathode 52 is connected by a conductor 59 to the negative side of a suitable electro-motive force 60 and is heated by the filament 53 supplied with current from a battery 61. It, therefore, is electron emissive. The grid anode 54 has a variable positive potential applied to it through a conductor 62 tapped into the electromotive force 60, and the disk anode 55 is at an even greater positive potential, it being connected by a conductor 63 with the positive side of the entire electromotive force 60.

A small opening 56 in the disk anode 55 restricts the electron flow beyond the disk anode to a beam and when the opening is square, the beam will have a square cross section. The electron beam 41 may be concentrated and focused by adjusting the voltage ratio between the grid anode 54 and the disk anode 55.

The targets 57 and 58 are electrically connected through a conductor 64, resistance 65, and conductor 66 to the negative side of the electromotive force 60. Thus, whenever the electron beam 41 falls upon one or the other of the end targets 57, 58, current will flow through the detecting circuit (in heavy lines) and the potential at the point 67 will change with respect to the point 68. This change in potential is amplified by a circuit (in light lines) including a power tube 69 connected to suitable recording apparatus.

The flow of current through the conductor 64 and the remainder of the detecting circuit will be approximately proportional to the deflection of the beam for, as shown in Fig. 4, the amount of current flow in the circuit depends upon the extent to which the beam 41 overlaps the target, this overlapping portion being represented by the shaded area 29. Inasmuch as the targets 57 and 58 each have a line edge, and since the beam in its preferred form is square in cross section, the current flow, within limits, will be directly proportional to the deflection of the beam, and the change in magnetic flux producing the deflection is therefore quantitatively indicated.

The power tube 69 comprises a filament 70 energized by a battery 71, a cathode 72 connected to the point 68 in the detecting circuit, and the negative side of an electromotive force 73, a grid 74 connected to the point 67 in the detecting circuit, and a plate 75 connected through an ammeter or other current measuring device 76, and a pair of back contact relays 77 and 78, having different pickup and drop away values, to the positive side of the electromotive force 73.

The relays 77 and 78 constitute part of the recording apparatus and operate pens 79 and 80 by means of coils 81 and 82, respectively, connected in parallel with an electromotive force 83 through the armatures of the back contact relays 77 and 78. The pens make their record on a moving chart 84 and whenever one or both of the relays 77 and 78 are actuated by the drop in the plate circuit of the amplifier, one or both (depending upon the extent of the current decrease) of the pen actuating relays 81 and 82 record the drop in current.

The ammeter 76 may be used to more accurately determine the drop in plate current due to the change in potential between the points 67 and 68.

To prevent the poles 48 and 49 from becoming electrically charged, they are preferably connected by a conductor 85 to the negative side of the electromotive force 60.

From the above description, it will be clear that when there is a longitudinal component of magnetic flux crossing the air gap between the poles 48 and 49, the electron beam will be deflected upwardly or downwardly depending upon the direction of the flux component or effective flux component. If the deflection is sufficient to cause the beam to strike one or the other of the targets, a current will flow through the tube circuit which in strength is proportional within limits to the deflection of the beam. The current flow is amplified by the power tube and relays actuate pens to record the change that has taken place in the cathode ray tube circuit.

In some cases, it is desirable to employ two or more cathode ray tubes arranged in tandem so that when the detecting apparatus is moved over the rail, the tubes will successively indicate the condition of the rail at any particular point. Preferably the tubes are arranged transversely of the rail as shown in Fig. 6 and are connected together in circuit as shown in Fig. 5 so that simultaneous action of the switches will produce current flows which exactly neutralize each other and thus have no effect upon the recording apparatus whereas successive operation of the switches will produce successively an increase and decrease of current and vice versa in the amplifying circuit which can be recorded by a polarized relay apparatus operating suitable pen relays.

The cathodes, heater filaments, grid anodes, disk anodes and targets of the double tube hookup are the same as described with reference to Fig. 2, and these parts will be given corresponding numbers. As a matter of fact, the only difference in the circuits is that the resistance 65 of Fig. 2 is divided into two equal parts 86 and 87 with the conductor 66 joining their adjacent ends to the negative side of the electromotive force 60. Thus, if the electron switches are closed simultaneously, the potential difference between points 67 and 68 remain unchanged, but if one or the other of the electron switches are closed without the other one at the same time being operated, there will be a change in potential between the points 67 and 68 and this will be recorded through the polarized relay 89 which operates the pen relays 90 and 91.

In Fig. 7, the cathode ray tube, or electron switch 42 is equipped with a center target 92 which carries a small positive potential with respect to the cathode through a conductor 93. This is to assist in directing the beam and give it stability. The tube is also equipped with a control grid 94 which determines the rate of emission of electrons from the cathode according to its negative potential which is received from an electromotive force 95. Other circuit combinations are shown in Figs. 8–15, inclusive, and these need not be described in detail, except to point out the manner in which each circuit distinguishes from some other circuit which has been previously described.

In Fig. 8, the electron switch is of the normally energized type, i. e. the electron beam is normally focused on a central target 96 which is connected through the conductor 64 and resistance 65 to the positive side of the electromotive force 60, thus placing the electromotive force 60 in series with the circuit. When the beam is deflected from the target 96, the potential difference between the points 67 and 68 falls to zero (or is decreased in case the beam does not completely leave the target 96) and this change in circuit condition is recorded through the front contact relays 78 and 79 of the recording apparatus.

In Fig. 9, two normally energized electron switches are shown connected in exactly the same manner as previously described with reference to Fig. 5 with the exception that here again the electromotive force 60 is in series with the center targets.

The circuit arrangement shown in Fig. 10 is exactly the same as shown in Fig. 8 with the exception that side targets 110 and 111 are provided which are connected to the cathode through a conductor 112, thus protecting the end of the tube from the deteriorating effects of the beam when the beam is off of the center target.

The circuit shown in Fig. 11 is substantially the same as shown in Fig. 5, the principal difference being that only one electron switch is employed, and the targets 57 and 58, instead of being electrically connected together in the manner shown in Fig. 2 are connected through the resistances 86 and 87 so that simultaneous energization of the targets 57, 57 by the beam 41 will not operate the recording apparatus. This might occur in case the beam is inadvertently put out of focus. The circuit is also applicable when it is desirable to obtain extreme sensitivity which may be accomplished by placing the targets 57, 58 quite close together. The circuit shown in Fig. 12 is identical with that shown in Fig. 11 with the exception that front and back contact relays 113 and 114 are substituted for the polarized relay 89 shown in Fig. 11.

Figure 13:
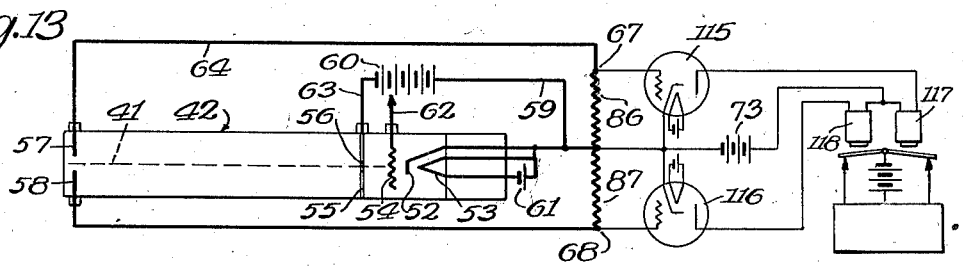
Fig. 13 is identical with Fig. 12 with the exception that two power tubes are employed, each of which actuates a back contact relay.

In Fig. 13, two power tubes 115 and 116 are used, each of which operates a back contact relay indicated at 117 and 118.

Figure 14:
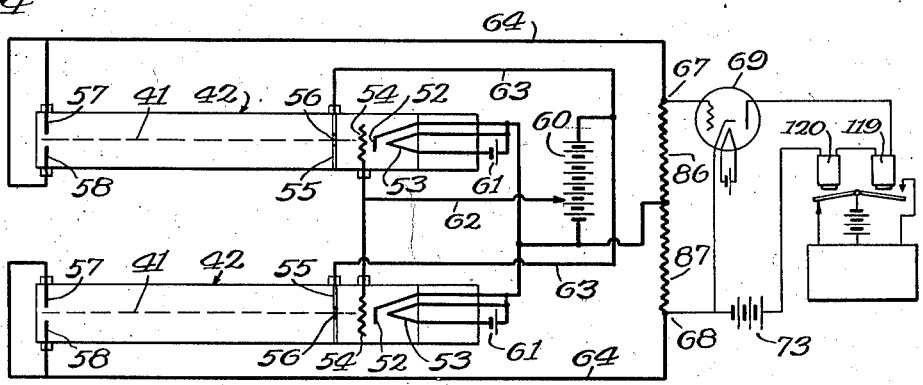
Fig. 14 shows a circuit using two electron switches, one power tube, and recording apparatus which includes a front and a back contact relay.
Figure 15:
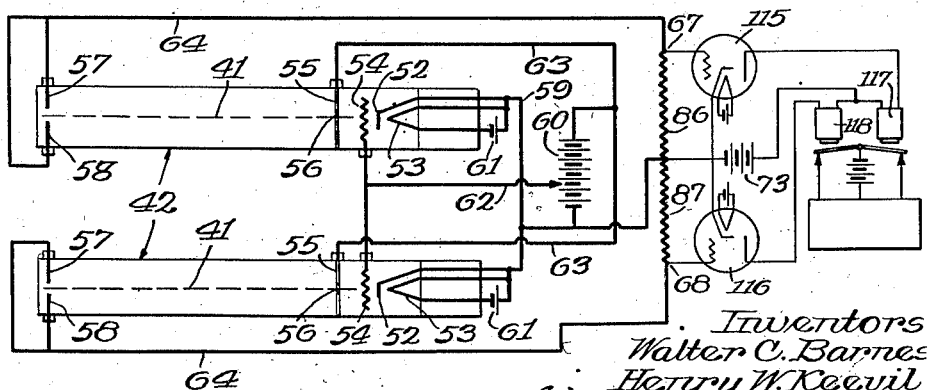
Fig. 15 is identical with Fig. 14 except that two power tubes are used, each of which operates a back contact relay.

A pair of normally de-energized switches are used in the circuit shown in Fig. 14 and the circuit is identical with that shown in Fig. 5 with the exception that separate front and back contact relays 119 and 120, respectively, are substituted for the polarized relay 89 shown in Fig. 5. Fig. 15 differs from Fig. 14 in that two amplifying tubes 115 and 116 are used, each of which operates a back contact relay 117, 118. Although in Figs. 8, 9 and 10, the resistance 65 is shown in series with the electromotive force 60, it may also be connected (as in the other circuit diagrams) to the negative side of the electromotive force.

It is also contemplated that an electromotive force may be introduced, if desired, into the detector circuit of any or all of the circuit arrangements shown in the drawings, as for example in series with the conductor 64.

In all forms of the invention, it is desirable to shield the cathode ray tube from the portion of the magnetic field which is not used in making the flaw indication record, and this may be accomplished by encasing each tube in a shield 121 (Fig. 16) of soft iron or other suitable material, the shield in the embodiment shown comprising a body portion 122 provided at its ends with screw threaded portions 123 for receiving caps 124 and 125, each of which has a central opening 126 to permit the various electrical connections to be led to their appropriate binding posts. The tube is supported within the magnetic shield by a felt washer 127 and by a tube socket 128, the latter being equipped with recesses to receive the prongs 129 on the base 130 of the cathode ray tube.

The two part core 43 associated with the switch has its horizontal portions 44 projecting through openings 131 in the sides of the shield and the core is magnetically insulated from the shield by suitable non-magnetic material, such as copper, brass, Bakelite, or the like, as indicated at 132.

It is not necessary that the electron switch be always mounted in a horizontal position although there are numerous reasons based upon mechanical convenience and electrical conditions which make this the preferable mounting. However, the tube may be mounted in a vertical position, as shown in Fig. 18, or an inclined position, as shown in Figs. 19 and 20. It should be pointed out that when the tube is mounted in a horizontal position, the electron beam is substantially parallel to the lines of force and if the tube is made as short as possible, the beam will cut very few of the lines of force which are inclined from the horizontal.

Inasmuch as an electron switch of this type is extremely sensitive, (although its sensitivity can be regulated by varying the air gaps in the magnetic circuit, the distance between the targets, and other components of the apparatus), it is desirable to provide some means for initially centering the beam in the tube. This can readily be accomplished by setting up controllable magnetic fields in opposition to those which tend to deflect the beam. For example, a pair of coils 133 and 134 (Fig. 21) may be placed on opposite sides of the tube where they may act upon the beam immediately after it passes the poles 48 and 49. The coils are connected in series and are wound in the same direction and the circuit also includes a suitable electromotive force 135, a reversing switch 136 and a rheostat 137. Thus, the vertical deflection of the beam may be adjusted.

Similarly, a pair of coils 138 and 139 may be placed above and below the tube and connected in series with an electromotive force 140, a reversing switch 141, and a rheostat 142. These coils enable the beam to be centered in a horizontal plane.

The effect of residual magnetism in the core may be overcome by setting up a counter-magnetic field which in reality amounts only to winding the coils 133 and 134 on the horizontal portions of the core (Fig. 22). Of course, the arrangement shown in Fig. 21 compensates for residual magnetism although technically it does not overcome it.

Although there are many reasons which favor the placement of the electron beam at right angles to the current flow, there are some cases in which the beam may be placed parallel to the direction of current flow. For example, it may be placed in the manner shown in Figs. 23 and 24, but in such a case, it is necessary to set up a counter-magnetic flux in order to center the beam. This may readily be accomplished by shunting a portion of the rail energizing current through coils 144, 145, 146 and 147 (Fig. 23), the former two being associated with a cathode ray tube 148, and the latter two being associated with a cathode ray tube 149. The coils are mounted on L-shaped cores, each of which consists of a vertical leg portion 150 and a horizontal portion 151, the latter abutting against the wall of the electron tube. The coil windings are in a direction that will oppose the magnetic flux set up by the current through the rail and a variable resistance 152 permits the flux set up by the coils to be adjusted to a value that will exactly counter-balance the flux created by the current through the rail. When this condition obtains, the electron beams in the tubes 148 and 149 are centered.

We claim as our invention:

1. Apparatus for detecting flaws in rails through which an electrical current is passing, comprising a detector unit for locating variations in the magnetic field surrounding the rail, said unit including a cathode ray tube and a core of magnetic material intersecting the tube, the core terminating in legs extending downwardly toward the rail.

2. Apparatus for detecting flaws in rails through which an electrical current is passing, comprising a detector unit for locating variations in the magnetic field surrounding the rail, said unit including a cathode ray tube and a core of magnetic material intersecting the tube and providing an air gap therein, and internal pole pieces for shortening the air gap.

3. Apparatus for detecting flaws in metallic bodies through which an electrical current is passing, comprising detection apparatus including a cathode ray tube, said tube comprising a source of electrons, means for forming a concentrated electron beam of square cross section, magnetic means for deflecting the beam in response to the magnetic field surrounding the body, recording means including an electrical circuit, a current indicator for the circuit, and a target in series with the beam, said target having a line edge adapted to be traversed by the beam when the latter is deflected by the magnetic means.

4. Apparatus for detecting flaws in rails and similar metallic bodies through which an electrical current is passing, comprising a detector unit comprising two or more electron switches at right angles to the direction of current flow and spaced apart, and a core associated with each switch for directing longitudinal components of the magnetic flux surrounding the rail through the switch.

5. Apparatus for detecting flaws in rails and similar metallic bodies through which an electrical current is passing, comprising a detecting unit comprising a pair of electron switches placed in the magnetic field surrounding the rail, recording apparatus including an electrical circuit arranged in the form of a bridge so that simultaneous operation of the two electron switches will not actuate the recording apparatus although successive operation of the switches will actuate said recording apparatus.

6. Apparatus for detecting flaws in rails and similar metallic bodies through which an electrical current is passing, comprising a detecting unit comprising a pair of electron switches placed in the magnetic field surrounding the rail, recording apparatus including an electrical circuit arranged so that simultaneous operation of the two electron switches produce impulses which cancel each other without having any effect on the recording apparatus although successive operation of the switches will actuate said recording apparatus, and means associated with the recording apparatus for indicating which switch has effected the indication.

7. Apparatus for detecting flaws in rails comprising means for progressively producing characteristic magnetic conditions in the vicinity of fissures, and an electron beam for locating said conditions, said beam being progressively moved along the rail while positioned transversely of the rail, and a core associated with the beam for concentrating longitudinal components of flux.

WALTER C. BARNES.
HENRY W. KEEVIL.